(12) United States Patent  
Shironoshita

(10) Patent No.: US 8,990,138 B2  
(45) Date of Patent: Mar. 24, 2015

(54) AUTOMATED VERIFICATION OF HYPOTHESES USING ONTOLOGIES

(71) Applicant: InfoTech Soft, Inc., Miami, FL (US)

(72) Inventor: Emilio Patrick Shironoshita, Miami, FL (US)

(73) Assignee: InfoTech Soft, Inc., Miami, FL (US)

( * ) Notice: Subject to any disclaimer, the term of this patent is extended or adjusted under 35 U.S.C. 154(b) by 0 days.

(21) Appl. No.: 13/914,912

(22) Filed: Jun. 11, 2013

(65) Prior Publication Data

US 2013/0275345 A1 Oct. 17, 2013

Related U.S. Application Data

(63) Continuation of application No. 13/484,937, filed on May 31, 2012.

(60) Provisional application No. 61/570,510, filed on Dec. 14, 2011.

(51) Int. Cl.  
*G06F 17/00* (2006.01)  
*G06N 5/02* (2006.01)  
*G06N 5/00* (2006.01)

(52) U.S. Cl.  
CPC . *G06N 5/02* (2013.01); *G06N 5/006* (2013.01)  
USPC .......................................... 706/45

(58) Field of Classification Search  
USPC ....................................... 706/12, 45  
See application file for complete search history.

(56) References Cited

PUBLICATIONS

Horridge et al., The OWL API: A Java API for OWL ontologies, 2011, Semantic Web, pp. 11-21.*  
Callahan et al., HyQue: evaluating hypotheses using Semantic Web technologies, 2011, Journal of Biomedical Semantics, pp. 1-16.*

* cited by examiner

*Primary Examiner* — David Vincent  
(74) *Attorney, Agent, or Firm* — Mark Terry

(57) ABSTRACT

A method on a computer for determining whether a hypothesis is verified by one or more ontologies. The method includes reading an address for a hypothesis comprised of one or more hypothesis axioms, wherein an axiom is represented in description logic form, reading an address for an ontology comprised of one or more ontology axioms and accessing the hypothesis and the ontology using the addresses that were read. The method further includes determining whether the ontology either corroborates or contradicts the hypothesis, identifying a first set of ontology axioms that corroborate the hypothesis and identifying a second set of ontology axioms that contradict the hypothesis, displaying a graphic indicating either corroboration or contradiction of the hypothesis, displaying the first set of ontology axioms together with a graphic indicating corroboration of the hypothesis and displaying the second set of ontology axioms together with a graphic indicating contradiction of the hypothesis.

6 Claims, 4 Drawing Sheets

AUTOMATED VERIFICATION OF HYPOTHESES USING ONTOLOGIES

CROSS-REFERENCE TO RELATED APPLICATIONS

This utility patent application is a continuation of utility patent application Ser. No. 13/484,937 filed May 31, 2012, which claims priority to provisional patent application No. 61/570,510, filed Dec. 14, 2011. The subject matter of utility patent application Ser. No. 13/484,937 and provisional patent application No. 61/570,510 is hereby incorporated by reference in its entirety.

STATEMENT REGARDING FEDERALLY SPONSORED RESEARCH OR DEVELOPMENT

This invention was made with government support under R44GM097851 awarded by the National Institutes of Health (NIH). The government has certain rights in this invention

INCORPORATION BY REFERENCE OF MATERIAL SUBMITTED ON A COMPACT DISC

Not Applicable.

FIELD OF THE INVENTION

The present invention relates to the field of information science and, more specifically, the present invention relates to the field of verification of hypotheses using existing knowledge bases.

BACKGROUND OF THE INVENTION

One of the touchstones of the scientific method is the testing of hypotheses. Thus, the practice of scientific research requires that hypotheses are verified against existing knowledge bases. When dealing with areas of research that span multiple domains, such as biomedical research, testing a hypothesis may require consultation in a variety of different areas of research. Consider, for example, the case of a researcher wishing to verify that the fusion gene TMPRSS2-ERG is associated with hydrolase activity. To test this hypothesis, the researcher would be required to perform multiple consultations within a variety of different knowledge bases involving biomedical research. This increases the complexity of the inquiry, as well the time required to execute it.

Another problem associated with conventional approaches to testing hypotheses relating to multiple and different areas of research involves the issue of testing all possible logical deductions entailed by different knowledge bases. Taking the example above, it is a logical deduction that an association with peptidase activity entails an association with hydrolase activity, since peptidase activity is a type of hydrolase activity. Thus, the researcher wishing to verify that the fusion gene TMPRSS2-ERG is associated with hydrolase activity would also have to test an association with peptidase activity, since it is a logical deduction. Finding and testing all logical deductions of a knowledge base can be time-consuming and error-prone.

Another problem associated with conventional approaches to testing hypotheses relating to different areas of research involves the issue of identifying those axioms that either support or contradict the hypothesis being tested. Conventional approaches may be used to determine whether a hypothesis is supported by a knowledge base, but fall short of identifying which specific axioms within the knowledge base support or contradict a hypothesis. Often, the identity of such supporting or contradicting axioms will shed light on the hypothesis and advance the research. Without the ability to identify such axioms, the utility of the conventional approaches are limited.

Therefore, what is needed is a system and method for addressing the problems with the prior art, and more particularly for a more efficient and user-friendly way for verifying hypotheses against existing knowledge bases.

BRIEF SUMMARY OF THE INVENTION

In one embodiment, the present invention discloses a method on a computer for determining whether a hypothesis is verified by one or more ontologies. The method includes reading an address for a hypothesis comprised of one or more hypothesis axioms, wherein an axiom is represented in description logic form; reading an address for an ontology comprised of one or more ontology axioms; accessing the hypothesis and the ontology using the addresses that were read; determining whether the ontology either corroborates or contradicts the hypothesis; wherein if the ontology corroborates the hypothesis, identifying a first set of ontology axioms that corroborate the hypothesis; wherein if the ontology contradicts the hypothesis, identifying a second set of ontology axioms that contradict the hypothesis; and displaying a graphic indicating either corroboration or contradiction of the hypothesis, displaying the first set of ontology axioms together with a graphic indicating corroboration of the hypothesis and displaying the second set of ontology axioms together with a graphic indicating contradiction of the hypothesis.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

The present invention improves upon the problems with the prior art by providing an efficient and user-friendly way for facilitating the verification of hypotheses and premise axioms against ontologies. One of the advantages of the present invention is that it allows a researcher to perform multiple consultations regarding a hypothesis within a variety of different knowledge bases at once and in an automated manner. Further, the present invention reduces or eliminates the problems associated with testing all possible logical deductions entailed by different knowledge bases. Another advantage of the present invention is that it identifies those axioms that either support or contradict the hypothesis being tested, thereby shedding light on the hypothesis and advancing the research. An additional benefit of the present invention is the ability for an administrator or user to verify a hypothesis against different permutations of ontologies and premise axioms in quick succession, one after another.

Figure 1:
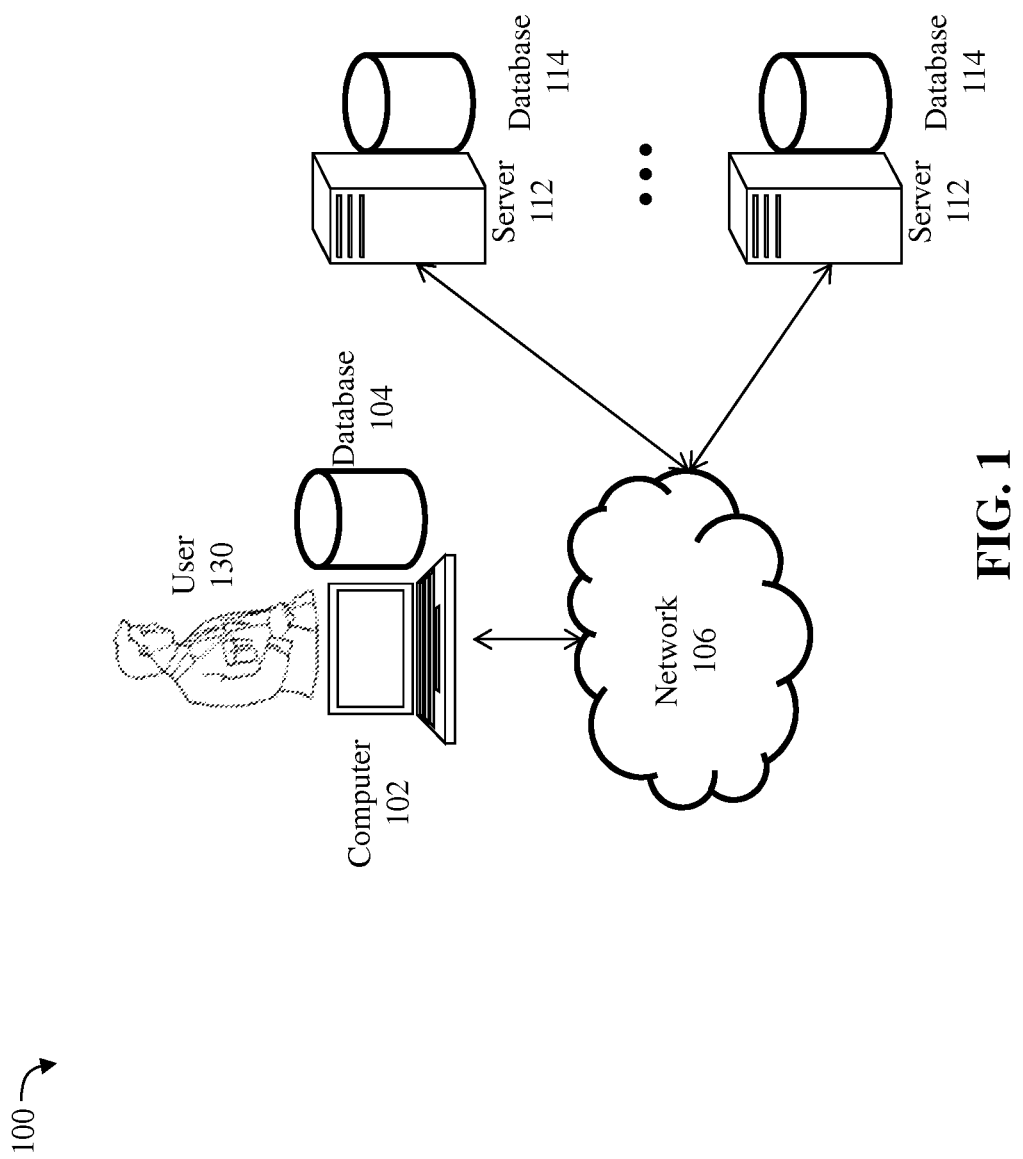
FIG. 1 is a block diagram illustrating the network architecture of a system for determining whether a hypothesis is verified by one or more ontologies, over a communications network, in accordance with one embodiment of the present invention.

Referring now to the drawing figures in which like reference designators refer to like elements, there is shown in FIG. 1 a block diagram illustrating the network architecture of a system 100 for determining whether a hypothesis is verified by one or more ontologies, over a communications network, in accordance with one embodiment of the present invention. FIG. 1 shows computer 102 associated with a data repository or database 104 and further coupled with network 106, which can be a circuit switched network, such as the Public Service Telephone Network (PSTN), or a packet switched network, such as the Internet or the World Wide Web, the global telephone network, a cellular network, a mobile communications network, a WAN, a LAN, or any combination of the above. Computer 102 may be a desktop, workstation, server computer, or a mobile computing device, such as a smart phone, mobile phone, tablet computer, handheld computer, laptop, or the like. Database 104 may store one or more ontologies, premise axioms and hypotheses. Computer 102 corresponds to an administrator 130, who may perform tasks on computer 102 that effectuate the method of the present invention.

FIG. 1 further includes one or more servers 112, which may be desktops, workstations, server computers, or mobile computing devices. Each server 112 is associated with a database 114 and each server 112 is connected to the network 106. The database 104, as well as any of the databases 114, may, for example, be a relational database comprising a Structured Query Language (SQL) database stored in a SQL server. The database 104, as well as any of the databases 114, may be distributed over one or more nodes or locations that are connected via network 106.

FIG. 1 shows an embodiment of the present invention wherein networked computers 112 interact with computer 102 over the network 106. Servers 112 may include a software engine that delivers applications, data, program code and other information to other computing devices, such as computer 102, via the network 106. It should be noted that although FIG. 1 shows only one computer 102 and one database 104, the system of the present invention supports any number of computers and databases connected via network 106. Further, the system of the present invention supports any servers 112 and associated databases connected via network 106.

Computer 102 and servers 112 include program logic comprising computer source code, scripting language code or interpreted language code that may be compiled to produce an executable file or computer instructions, or that may be interpreted at run-time, wherein the computer source code performs various functions of the present invention.

Note that although computer 102 and servers 112 are each shown as a single and independent entity, in one embodiment of the present invention, the functions of computer 102 and/or any of the servers 112 may be integrated with another entity. Further, computer 102 and/or any of the servers 112 and their functionality, according to a preferred embodiment of the present invention, can be realized in a centralized fashion in one computer system or in a distributed fashion wherein different elements are spread across several interconnected computer systems.

An ontology is a form of knowledge representation about the world or some part of it. An ontology formally represents knowledge as a set of concepts within a domain, and the relationships between pairs of concepts. The utility of an ontology is that it provides a shared vocabulary, which can be used to model a domain, that is, the type of objects and/or concepts that exist, and their properties and relations.

An ontology $O$ can be conceptualized as a set of axioms and assertions, $O=\{\alpha_i\}$. The signature Sig($O$) of an ontology is the set of entities referred to in the ontology, where entities can be either classes, properties or roles, or individuals. By extension, the signature of an axiom or assertion denotes the entities to which the axiom or assertion refers. Axioms define classes or properties, while assertions define membership of instances in classes and property relationships between instances. In this patent application, the term axiom is used to refer to both axioms and assertions.

Ontologies take advantage of description logic (DL)-based formalisms to represent knowledge. Description logic is a family of formal knowledge representation languages and provides a logical formalism for ontologies. Description logic provides a strong mathematical underpinning for ontologies conceptualized in this way, where expressivity of ontologies is defined based upon the types of axioms allowed. Description logic also defines reasoning or inferencing capabilities over ontologies, whereby axioms not explicitly asserted can be inferred based on logical consequences.

The basic reasoning mechanisms afforded by ontologies is entailment, i.e., the ability to verify if an ontology $O$ implies an axiom $\alpha$. Entailment refers to the relationship between statements that holds true when one logically follows from one or more others. Entailment can be defined using set-theoretic semantics. A succinct summary of entailment follows. An interpretation is an assignment of meaning to the symbols of a formal language. An interpretation $I$ is defined as a pair ($\Delta^I, \cdot^I$), where $\Delta^I$ is the domain of interpretation, and $\cdot^I$ is a function that maps each concept A in an ontology to a set $A^I \subseteq \Delta^I$, each role R to a binary relation $R^I \subseteq \Delta^I \times \Delta^I$, and each individual a to an element $a^I \in \Delta^I$. An interpretation is said to satisfy an axiom $\alpha$, denoted $I \models \alpha$, if the interpretation can model the semantics of the axiom. For example, given two classes C and D, and a subclass axiom $C \sqsubseteq D$, an interpretation $I$ satisfies the axiom if $C^I \subseteq D^I$, i.e., if the interpretation of C is a subset of the interpretation of D. Stated differently, an axiom is satisfiable if it is possible to find an interpretation that makes the axiom true. An interpretation is said to be a model of ontology $O$ if the interpretation satisfies all axioms in $O$. An ontology is said to be consistent if there exists at least one model $I$ of $O$. An ontology $O$ implies, or is said to imply, an axiom $\alpha$ if for every model $I$ of $O$, $I \models \alpha$. Ontologies may be coded using OWL 2, the Web Ontology Language, which has been standardized by the World Wide Web Consortium.

Figure 2:
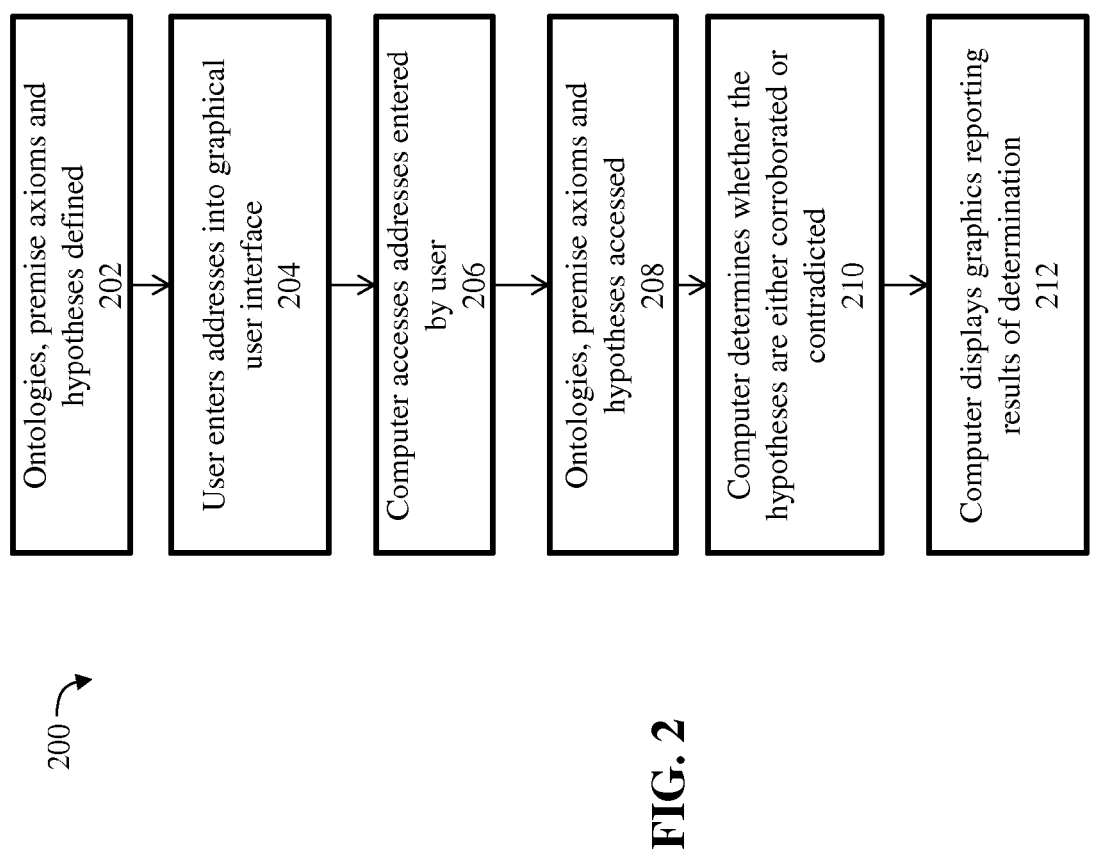
FIG. 2 is a flow chart depicting the general control flow of a process for determining whether a hypothesis is verified by one or more ontologies, over a communications network, according to one embodiment of the present invention.

FIG. 2 is a flow chart depicting the general control flow of a process 200 for determining whether a hypothesis is verified by one or more ontologies, over a communications network 106, according to one embodiment of the present invention.

The process 200 begins with step 202 wherein one or more ontologies, each comprised of one or more ontology axioms, have been defined and stored in a location in database 104 or any of the databases 114. Each of the stored ontologies have an address, such as a network address, a URL, a file path, a directory path, IP address, MAC address, host address or the like, which specifies a unique location of the ontologies in a file system that may be accessible via network 106. Also in step 202, one or more hypotheses, each comprised of one or more hypothesis axioms, have been defined and stored in a location in database 104 or any of the databases 114, and, optionally, one or more premise axioms have been defined and stored in a location in database 104 or any of the databases 114. Each of the stored hypotheses and the premise axioms have an address. Note that each of ontology axioms, hypothesis axioms and premise axioms may be represented in description logic form or in OWL 2 format, for example. In one alternative, the hypothesis axioms are stored in memory (such as RAM), in which case they are not stored in databases 104, 114. In said embodiment, the address of the hypothesis axioms is the address of the hypothesis axioms in memory.

In step 204, the user 130 enters into a graphical user interface the address for the one or more hypotheses, the address for the one or more ontologies, and, optionally, the address for the premise axioms. In step 206, the computer 102 reads, from the graphical user interface, the addresses that were entered by a user 130. In step 208, the computer 102 accesses the one or more hypotheses, the one or more ontologies and the one or more premise axioms using the addresses that were read. Note that the addresses that were read may indicate locations in remote databases accessible over the network 106. Thus, in step 208, the computer 102 may access the one or more hypotheses, the one or more ontologies and/or the one or more premise axioms over the network 106 using the addresses that were read.

In step 210, the computer 102 determines whether the one or more hypotheses and are either corroborated or contradicted by the ontologies, the computer 102 identifies ontology axioms that corroborate the hypotheses and identifies ontology axioms that contradict the hypotheses. The details of step 210 are described below in greater detail. In step 212, the graphical user interface displays a graphic indicating either corroboration or contradiction of the hypothesis and premise axioms by the ontologies. The graphic may be alphanumeric and/or may include colors, designs and other visual indicators. Also in step 212, the graphical user interface displays a first set of ontology axioms that have been found to corroborate the hypotheses, together with a graphic indicating corroboration of the hypothesis. Also in step 212, the graphical user interface displays a second set of ontology axioms that have been found to contradict the hypotheses, together with a graphic indicating contradiction of the hypothesis. Subsequently, control may flow back to step 202 wherein the process 200 may be repeated.

Figure 3:
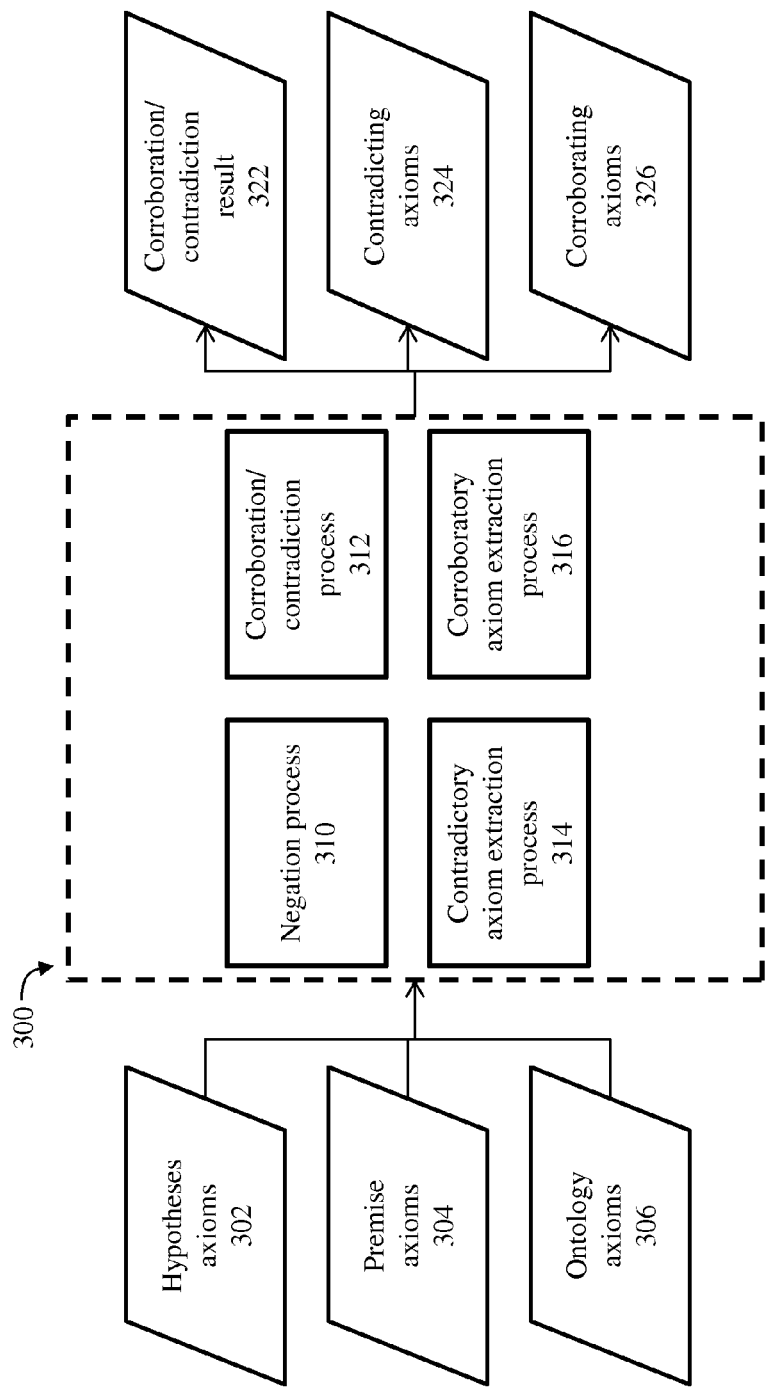
FIG. 3 is a block diagram providing more detail of the process 300 depicted in a step of FIG. 2, according to one embodiment of the present invention.

FIG. 3 is a block diagram providing more detail of the process 300 depicted in a step of FIG. 2, according to one embodiment of the present invention. Specifically, the process 300 provides more detail about step 210 of FIG. 2 wherein the computer 102 determines whether the one or more hypotheses and premise axioms are either corroborated or contradicted by the ontologies, identifies ontology axioms that corroborate the hypotheses and identifies ontology axioms that contradict the hypotheses.

FIG. 3 shows that process 300 comprises the combination of processes 310, 312, 314, and 316. The inputs to the process 300 are the hypotheses axioms 302, the premise axioms 304 and the ontology axioms 306 accessed by computer 102 in step 208 above. The outputs to the process 300 include the corroboration/contradiction result 322 determined by the computer in step 210 and displayed by the computer in step 212 above. The outputs to the process 300 further include the contradicting axioms 324 and the corroborating axioms 326 determined by the computer in step 210 and displayed by the computer in step 212 above.

Prior to discussing the negation process 310, a brief discussion of hypothesis encoding is warranted. A hypothesis encoding $\mathcal{B} = (\mathcal{B}_0, \mathcal{B}_p)$ consists of a set of axioms divided in two disjoint parts: a non-empty set $\mathcal{B}_0$ of axioms, called the hypothesis, and a possibly empty set $\mathcal{B}_p$ of axioms called the premise. Hypothesis axioms express the beliefs to be verified, while premise axioms express facts that are to be assumed as true for purposes of verification of this particular belief. Both hypothesis and premise axioms have the same syntax and semantics as ontology axioms, and as such both the hypothesis and the premise can be considered ontologies.

A hypothesis encoding $\mathcal{B}$ is defined to be relevant to an ontology $O$ if it shares entities with $O$; in other words, if $\text{Sig}(\mathcal{B}) \cap \text{Sig}(O) \neq \emptyset$. The hypothesis must only contain entities that exist either in the ontology or in the premise, i.e., $\text{Sig}(\mathcal{B}_0) \subseteq \text{Sig}(O) \cup \text{Sig}(\mathcal{B})$. In one embodiment, the ontology $O$, as represented by the hypothesis axioms 306, may be represented in the Web Ontology Language (OWL), in both its first version, and its second version, named OWL 2.

Returning to FIG. 3, the process 300 begins with the negation process 310 wherein the negation of all hypothesis axioms 302. The process of generating the negation of an axiom is referred to as axiom negation. Given an axiom a, its negation, denoted $\neg \alpha$, is an axiom so that an ontology formed by an axiom and its negation is inconsistent.

Construction of axiom negations can be generally achieved through the use of concept negation and role negation. For exemplary purposes, the following table presents different types of axioms and their negations:

| Axiom | | Negation of axiom | |
|---|---|---|---|
| Type | Syntax | Type | Notation |
| Class subsumption | $C \sqsubseteq D$ | Class disjointness | $C \sqsubseteq \neg D$ |
| Class equivalence | $C \equiv D$ | Class disjointness | $C \sqsubseteq \neg D$ |
| Class disjointness | $C \sqsubseteq \neg D$ | Class subsumption | $C \sqsubseteq D$ |
| Class assertion | $C(a)$ | Complement of class assertion | $\neg C(a)$ |
| Role assertion | $R(a, b)$ | Negative role assertion | $\neg R(a, b)$ |
| Role inclusion | $R \sqsubseteq S$ | Role disjointness | $R \sqsubseteq \neg S$ |
| Role equivalence | $R \equiv S$ | Disjoint properties | $R \sqsubseteq \neg S$ |

| Axiom | | Negation of axiom | |
|---|---|---|---|
| Type | Syntax | Type | Notation |
| Role domain | {C|∀R(a, b), C(a)} | Complement of role domain | {C|∀R(a, b),¬ C(a)} |
| Role range | {C|∀R(a, b), C(b)} | Complement of role range | {C|∀R(a, b),¬ C(b)} |

Note that class disjointness is equivalent to subsumption of one class over the complement of the other. Expressivity restrictions on DL-based ontologies present certain restrictions on the availability of axiom negation. In particular, OWL 2 DL, which has expressivity of SROIQ(D), does not contain role negation directly, and thus does not allow a full range of negated axioms; sub-property chains, for example, cannot be negated. OWL 2 DL does use role negation in specific circumstances, such as in negative property assertions.

The process 300 continues with the corroboration/contradiction process 312 wherein the computer 102 determines whether the ontology 306 and the premise axioms 304 either corroborate or contradict the hypothesis 302. In one embodiment, process 312 is executed as follows. A semantic reasoner is configured to evaluate consistency of each of the hypothesis axioms 302 with the ontology axioms 306 and the premise axioms 304; and evaluate inconsistency of a negation of each of the hypothesis axioms 302 (as generated by process 310) with the ontology axioms 306 and the premise axioms 304. A semantic reasoner or ontology reasoner is a piece of software, well known to one of ordinary skill in the art, able to infer logical consequences from a set of asserted facts or axioms.

A more rigorous explanation of process 312 follows. An axiom α is said to be corroborated by an ontology $O$ if $O \models \alpha$, and is said to be contradicted if $O \models \neg \alpha$. It follows that an axiom is corroborated if its negation is contradicted. Note that it is possible that an axiom be neither corroborated nor contradicted by an ontology. A hypothesis encoding $\mathcal{B}=(\mathcal{B}_0, \mathcal{B}_p)$ is further said to be corroborated by an ontology $O$ if all of its hypothesis axioms $\alpha_i \in \mathcal{B}_0$ are corroborated by the ontology $O_p = O \cup \mathcal{B}_p$, and similarly $\mathcal{B}$ is said to be contradicted by $O$ if all of its $\alpha_i \in \mathcal{B}_0$ are contradicted by $O_p$. Moreover, the negation of a hypothesis is given by the negation of every axiom, $\neg \mathcal{B}_0 = \{\neg \alpha_i\}$. The negation of a hypothesis encoding is composed by the negation of its hypothesis and the (non-negated) premise, $\neg \mathcal{B}=(\neg \mathcal{B}_0, \mathcal{B}_p)$. Thus, if a hypothesis encoding $\mathcal{B}$ is corroborated by an ontology $O$, its negation $\neg \mathcal{B}$ is contradicted by $O$.

From the definition of axiom corroboration above, and the definition of entailment, it follows that an axiom α is corroborated by $O$ if the ontology $O \cup \{\alpha\}$ is consistent and $O \cup \{\neg \alpha\}$ is not. Hypothesis verification is thus achieved by creating a new ontology and testing consistency of $O_p \cup \{\alpha_i\}$ and of $O_p \cup \{\neg \alpha_i\}$ for each $\alpha_i \in \mathcal{B}_0$. Consistency testing may be performed using any standard ontology or semantic reasoner, well known to one of ordinary skill in the art.

Returning to process 312 of FIG. 3, if: 1) all of the hypothesis axioms 302 and all of the premise axioms 304 are consistent with all of the ontology axioms 306 and 2) the negation of all of the hypothesis axioms 302 and all of the premise axioms 304 are inconsistent with all of the ontology axioms 306, then the ontology 306 corroborates the hypothesis 302. If, however, 1) all of the hypothesis axioms 302 and all of the premise axioms 304 are inconsistent with all of the ontology axioms 306, and 2) the negation of all of the hypothesis axioms 302 and all of the premise axioms 304 are not inconsistent with all of the ontology axioms 306, then the ontology 306 contradicts the hypothesis 302. Based on the result of the if-then statements above, the corroboration/contradiction result 322 is produced according to whether the hypothesis encoding, comprised of the hypothesis axioms 302 and the premise axioms 304, is corroborated or contradicted by the ontology defined by the ontology axioms 306. The corroboration/contradiction result 322 is produced as output by the computer in step 210 and displayed by the computer in step 212 above. The corroboration/contradiction result 322 may be an alphanumeric value, a graphic, or any combination of the above. The corroboration/contradiction result 322 may be stored by the computer 102 in database 104 for later use.

Returning to FIG. 3, the process 300 continues with processes 314 and 316 which comprises the extraction of those axioms that corroborate and/or contradict the hypothesis. In process 316, the computer 102 identifies a first set 326 of ontology axioms 306 that corroborate the hypothesis 302 and in process 314 the computer 102 identifies a second set 324 of ontology axioms 306 that contradict the hypothesis 302.

In one embodiment, the process 316 of identifying the first set 326 of ontology axioms 306 that corroborate the hypothesis 302 further comprises identifying all justifications for any of the hypothesis axioms 302 over the ontology 306. In another embodiment, the process 314 of identifying a second set 324 of ontology axioms 306 that contradict the hypothesis 302 further comprises identifying all justifications for a negation of any of the hypothesis axioms 302 over the ontology 306.

A more rigorous explanation of the processes 314, 316 follows. Determination of corroboration or contradiction of hypotheses encoded as beliefs is performed based on entailment justification. Given an ontology $O$ and inferred axiom α such that $O \models \alpha$, a justification $J$ is defined as a subset $J \subseteq O$ such that $J \models \alpha$, and there does not exist $J' \subseteq J$ such that $J' \models \alpha$. Intuitively, a justification is a set of axioms that explain the reason why α is inferred.

Given a corroborated hypothesis encoding $\mathcal{B}=(\mathcal{B}_0, \mathcal{B}_p)$ over an ontology $O$, a corroboration explanation is a set of axioms $\mathcal{E} = \cup J_{i,i}$, where each $J_i$ is a justification for some $\alpha_i \in \mathcal{B}_0$ over the ontology $O_p = O \cup \mathcal{B}_p$, and where for any subset $\mathcal{E}_s$ of $\mathcal{E}$, $\text{Sig}(\mathcal{E}_s) \cap \text{Sig}(\mathcal{E} \setminus \mathcal{E}_s) \neq \emptyset$. The last condition establishes that there must be a path between any two axioms in an explanation, where the connection between two axioms is defined by shared entities, and indicates how justifications from separate axioms must be put together to conform an explanation. Thus, the subject matter of a corroboration explanation comprises the corroborating axioms 326.

A contradiction explanation is a corroboration explanation for the negation of a hypothesis encoding. Thus, extraction of a corroboration explanation is equivalent to extraction of the contradiction explanation of its negation, and vice versa. And as before, the subject matter of a contradiction explanation comprises the contradicting axioms 324.

To extract a contradiction explanation, we first extract the justifications for each of the axioms in $\mathcal{B}_0$. There are many mechanisms by which extraction of a justification of an axiom $\alpha_i$ over an ontology $O_p$ can be achieved. The most straightforward mechanism assumes that all premise axioms are part of every justification, obtains all the sets $O_k \in \mathcal{P}(O)$, where $\mathcal{P}(O)$ is the powerset of $O$, and checks whether $O_k \cup \{\alpha_i\}$ is inconsistent; if it is, it is added to a set $S_i$ of justifications if there does not exist another such $O_j \in S$ such that $O_j \subseteq O_k$. If $O_k$ is added to $S_i$, every $O_m \in S_i$ such that $O_k \subset O_m$ is subsequently removed from $S_i$. After processing all $O_k \in \mathcal{P}(O)$, the set S contains all the justifications of $\alpha_i$ over $O_p$.

A more efficient mechanism starts from the set of premise axioms $\mathcal{B}_p$ as a potential justification. Then, to augment a potential justification $O_k$ by an axiom $\alpha_n \in O$, the axiom must have at least one entity in common with the axioms in $O_k$. This defines a search tree with an ontology defined by the premise axioms $\mathcal{B}_p$ at the top, and as many children ontologies from every node as there are axioms that have at least one entity in common with the ontology defined at the node. This tree is then searched breadth-first, where each ontology $O_k$ is first checked to see if any other ontology $O_j \in S_i$ such that $O_j \subseteq O_k$ has already been processed; if it has, the subtree at node $O_k$ is removed from the search tree. Then, $O_k \cup \{\alpha_i\}$ is checked to see whether it is inconsistent; if it is, it is added to a set $S_i$ of justifications, and the search tree is pruned of any nodes below $O_k$, since they define its supersets. Additionally the search tree is pruned of any subtree at a node that defines any other (non-proper) superset of an already processed ontology.

Any of the two mechanisms for extraction of justifications of a single axiom (whether for a contradiction explanation or a corroboration explanation) is repeated for all $\alpha_i \in \mathcal{B}_0$. Then, explanations $\mathcal{E}_x$ are formed by performing the set-union of justifications from different axioms, checking that for any subset $\mathcal{E}_s$ of $\mathcal{E}$, $\text{Sig}(\mathcal{E}_s) \cap \text{Sig}(\mathcal{E} \setminus \mathcal{E}_s) \neq \emptyset$.

Figure 4:
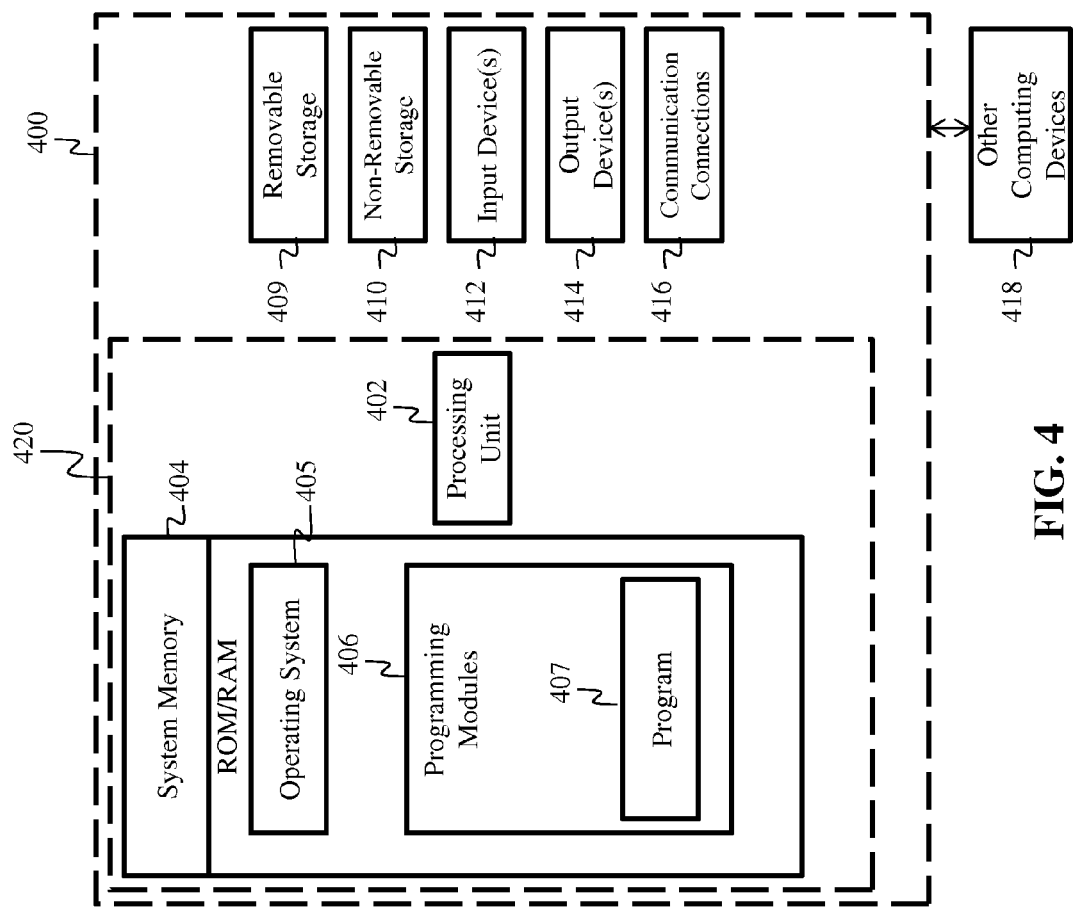
FIG. 4 is a block diagram of a system including an example computing device and other computing devices.

FIG. 4 is a block diagram of a system including an example computing device 400 and other computing devices. Consistent with the embodiments described herein, the aforementioned actions performed by computer 102 and servers 112 may be implemented in a computing device, such as the computing device 400 of FIG. 4. Any suitable combination of hardware, software, or firmware may be used to implement the computing device 400. The aforementioned system, device, and processors are examples and other systems, devices, and processors may comprise the aforementioned computing device. Furthermore, computing device 400 may comprise an operating environment for all or a portion of the processes, methods, control flows and data flows shown in FIGS. 2-3 above.

With reference to FIG. 4, a system consistent with an embodiment of the invention may include a plurality of computing devices, such as computing device 400. In a basic configuration, computing device 400 may include at least one processing unit 402 and a system memory 404. Depending on the configuration and type of computing device, system memory 404 may comprise, but is not limited to, volatile (e.g. random access memory (RAM)), non-volatile (e.g. read-only memory (ROM)), flash memory, or any combination or memory. System memory 404 may include operating system 405, one or more programming modules 406 (such as program module 407). Operating system 405, for example, may be suitable for controlling computing device 400's operation. In one embodiment, programming modules 406 may include, for example, a program module 407. Furthermore, embodiments of the invention may be practiced in conjunction with a graphics library, other operating systems, or any other application program and is not limited to any particular application or system. This basic configuration is illustrated in FIG. 4 by those components within a dashed line 420.

Computing device 400 may have additional features or functionality. For example, computing device 400 may also include additional data storage devices (removable and/or non-removable) such as, for example, magnetic disks, optical disks, or tape. Such additional storage is illustrated in FIG. 4 by a removable storage 409 and a non-removable storage 410. Computer storage media may include volatile and nonvolatile, removable and non-removable media implemented in any method or technology for storage of information, such as computer readable instructions, data structures, program modules, or other data. System memory 404, removable storage 409, and non-removable storage 410 are all computer storage media examples (i.e. memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 400. Any such computer storage media may be part of device 400. Computing device 400 may also have input device(s) 412 such as a keyboard, a mouse, a pen, a sound input device, a camera, a touch input device, etc. Output device(s) 414 such as a display, speakers, a printer, etc. may also be included. The aforementioned devices are only examples, and other devices may be added or substituted.

Computing device 400 may also contain a communication connection 416 that may allow device 400 to communicate with other computing devices 418, such as over a network in a distributed computing environment, for example, an intranet or the Internet. Communication connection 416 is one example of communication media. Communication media may typically be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media. The term computer readable media as used herein may include both computer storage media and communication media.

As stated above, a number of program modules 406 and data files may be stored in system memory 404, including operating system 405. While executing on processing unit 402, programming modules 406 may perform processes including, for example, all or a portion of the processes, methods, control flows and data flows shown in FIGS. 2-3 above. The aforementioned processes are examples, and processing unit 402 may perform other processes. Other programming modules that may be used in accordance with embodiments of the present invention may include electronic mail and contacts applications, word processing applications, spreadsheet applications, messaging applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip (such as a System on Chip) containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, or other forms of RAM or ROM. Further, the disclosed methods' stages may be modified in any manner, including by reordering stages and/or inserting or deleting stages, without departing from the invention.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method on a computer for determining whether a hypothesis is verified by one or more ontologies, the method comprising:
    reading an address for a hypothesis comprised of one or more hypothesis axioms, wherein an axiom is represented in first order logic form;
    reading an address for one or more premise axioms;
    reading an address for an ontology comprised of one or more ontology axioms;
    accessing the hypothesis and the ontology using the addresses that were read for the hypothesis and the ontology;
    accessing the one or more premise axioms using the address that was read for the premise axioms;
    determining whether the ontology either corroborates or contradicts the hypothesis together with the one or more premise axioms by performing the following:
        executing a semantic reasoner configured to:
            evaluate consistency of each of the hypothesis axioms and the premise axioms with the ontology axioms; and
            evaluate consistency of a negation of each of the hypothesis axioms and the premise axioms with the ontology axioms; and
        wherein if all of the hypothesis axioms and all of the premise axioms are consistent with the ontology axioms, and if the negation of all of the hypothesis axioms and all of the premise axioms are inconsistent with the ontology axioms, then the ontology corroborate the hypothesis together with the premise axioms; and
        wherein if all of the hypothesis axioms and all of the premise axioms are inconsistent with the ontology axioms, and if the negation of all of the hypothesis axioms and all of the premise axioms are consistent with the ontology axioms, then the ontology contradicts the hypothesis together with the premise axioms;
    wherein if the ontology corroborates the hypothesis, identifying a first set of ontology axioms that corroborate the hypothesis;
    wherein if the ontology contradicts the hypothesis, identifying a second set of ontology axioms that contradict the hypothesis; and
    displaying a graphic indicating either corroboration or contradiction of the hypothesis, displaying the first set of ontology axioms together with a graphic indicating corroboration of the hypothesis and displaying the second set of ontology axioms together with a graphic indicating contradiction of the hypothesis.

2. The method of claim 1, wherein the step of identifying a first set of ontology axioms further comprises identifying all justifications for all of the hypothesis axioms over the ontology and the premise axioms.

3. The method of claim 2, wherein the step of identifying a second set of ontology axioms further comprises identifying all justifications for a negation of all of the hypothesis axioms over the ontology and the premise axioms.

4. A method on a computer for determining whether a hypothesis is verified by one or more ontologies, the method comprising:
    reading, from a graphical user interface, an address for a hypothesis comprised of one or more hypothesis axioms, wherein an axiom is represented in first order logic form, an address for an ontology comprised of one or more ontology axioms, and an address for one or more premise axioms, wherein each address was entered by a user;
    accessing the hypothesis, the ontology and the one or more premise axioms using the addresses that were read;
    determining whether the ontology either corroborates or contradicts the hypothesis together with the one or more premise axioms by performing the following:
        executing a semantic reasoner configured to:
            evaluate consistency of each of the hypothesis axioms and the premise axioms with the ontology axioms; and
            evaluate consistency of a negation of each of the hypothesis axioms with the ontology axioms; and
        wherein if all of the hypothesis axioms and all of the premise axioms are consistent with the ontology axioms, and if the negation of all of the hypothesis axioms are inconsistent with the ontology axioms, then the ontology corroborate the hypothesis together with the premise axioms; and wherein if all of the hypothesis axioms and all of the premise axioms are inconsistent with the ontology axioms, and if the negation of all of the hypothesis axioms are consistent with the ontology axioms, then the ontology contradicts the hypothesis together with the premise axioms;

identifying a first set of ontology axioms that corroborates the hypothesis and identifying a second set of ontology axioms that contradicts the hypothesis; and displaying a graphic indicating either corroboration or contradiction of the hypothesis, displaying the first set of ontology axioms together with a graphic indicating corroboration of the hypothesis and displaying the second set of ontology axioms together with a graphic indicating contradiction of the hypothesis.

5. The method of claim 4, wherein the step of identifying a first set of ontology axioms or premise axioms that corroborate the hypothesis further comprises identifying all justifications for all of the hypothesis axioms over the ontology and the premise axioms.

6. The method of claim 5, wherein the step of identifying a second set of ontology axioms or premise axioms that contradict the hypothesis further comprises identifying all justifications for a negation for all of the hypothesis axioms over the ontology and the premise axioms.

* * * * *